J. J. CROWLEY.
Grain Separator and Mixer.

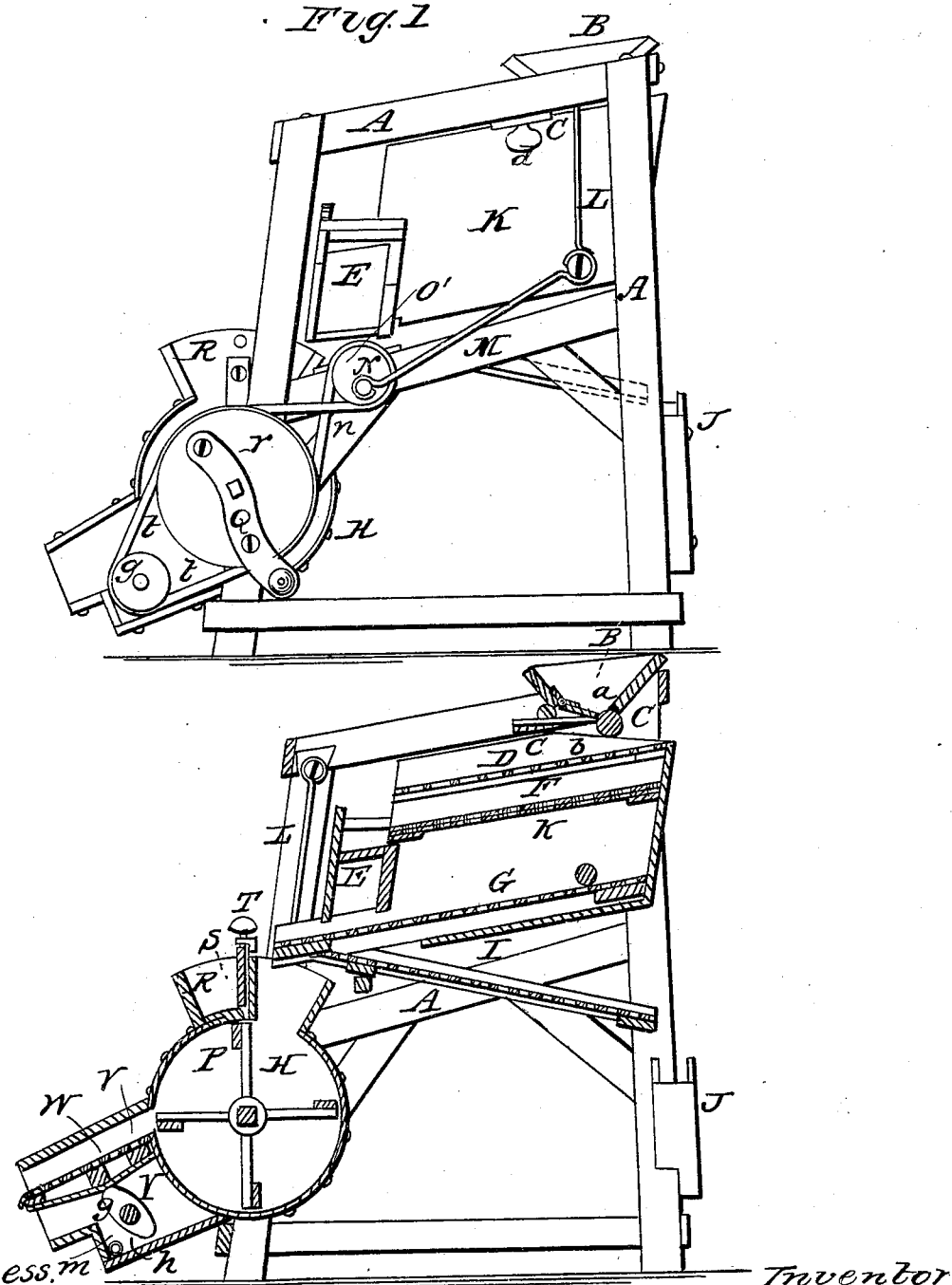

Patented June 8, 1869.

United States Patent Office.

JAMES J. CROWLEY, OF SAN FRANCISCO, CALIFORNIA.

Letters Patent No. 90,932, dated June 8, 1869.

---

IMPROVEMENT IN GRAIN-SEPARATOR AND MIXER.

---

The Schedule referred to in these Letters Patent and making part of the same.

---

*To all whom it may concern:*

Be it known that I, JAMES J. CROWLEY, of the city and county of San Francisco, State of California, have invented a Grain-Separator and Mixer; and I do hereby declare the following description and accompanying drawings are sufficient to enable any person skilled in the art or science to which it most nearly appertains, to make and use my said invention or improvement without further invention or experiment.

My invention relates to a machine by which the different grains, but more especially wheat, may be separated from other sorts, and also from mustard and all other small seeds, so that a pure and unadulterated grain may be obtained for seeding-purposes, and that only the largest and best shall be retained for that purpose.

It consists in providing a mixer by which a solution of the sulphate of copper (blue vitriol) may be thoroughly incorporated with the cleaned grain, for preventing smut, and the depredations of birds and other animals, and it is prepared for sowing, with half the expense and time ordinarily devoted to it.

To effect the first part of my process, the grain is emptied from the sack into a hopper, with an adjustable feed, from which it is discharged upon a series of shaking-screens, so arranged, with relation to the size of their meshes, that all chaff and crushed grain shall be retained by and discharged from the first screen, the barley and oats by the next two or three, which also discharges from their upper surface like the first.

The next screen catches and discharges into the mixer all the large, fair wheat, while the smaller grain is allowed to pass through upon another and finer screen, by which it is saved for market, while the mustard and such small seeds are entirely separated.

The second part of my machine consists of a hopper, into which a solution of $CuO,SO_3$, is placed, and fed through a gate into the cylindrical mixer, where it is thoroughly incorporated with the grain, by means of a revolving stirrer, after which the grain passes out over a final moving screen, and is sacked ready for use.

For a more full explanation of my invention, reference is made to the accompanying drawings, forming part of this specification, of which—

Figure 1 is a side elevation of the machine.

Figure 2 is a side sectional elevation.

Similar letters of reference in each of the drawings indicate like parts.

Figure 3:
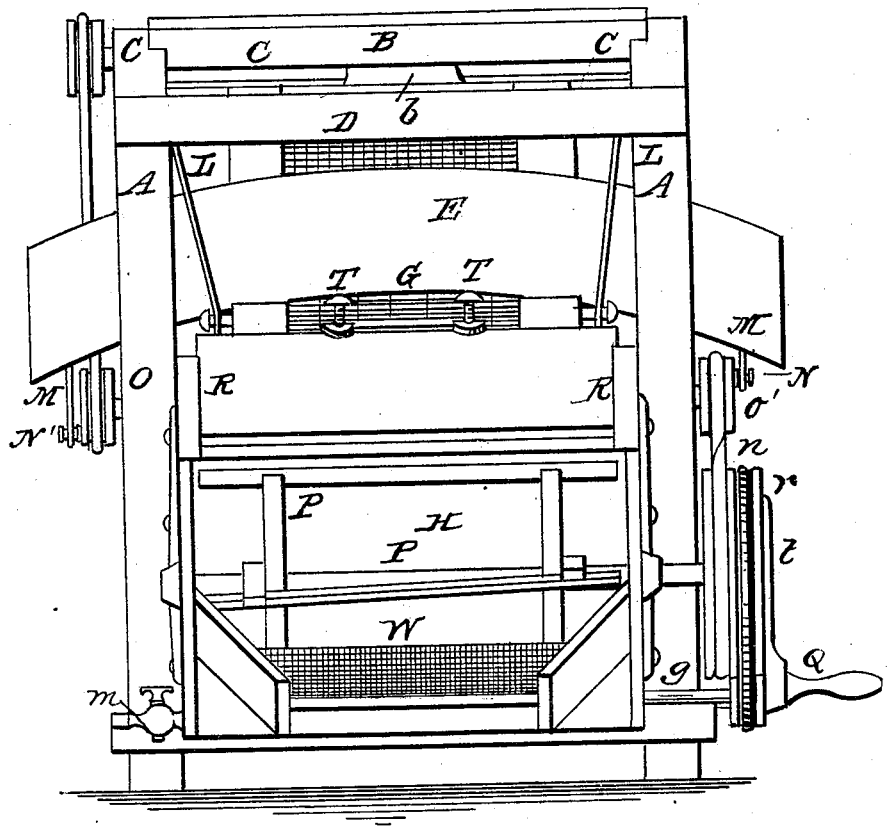
Figure 3 is a front view, with the cover of the mixer removed.

A is a stout frame, of wood, which may be made about five feet in height, although the proportions will vary somewhat in different-sized machines.

Across the top of this frame, near the back, a hopper, B, extends, within which the grain is emptied from the sacks, and from which it is discharged through the feed-opening upon the screens, being assisted in its passage by the roller C.

The front part, *a*, of the bottom of the hopper, may be hinged, and is adjusted so as to feed as much or as little as desired, by a lug, *b*, on the plate *c*.

This plate extends entirely across the machine above the screens, and one end is raised and lowered by a screw, *d*, moving the bottom, *a*, with it, and thus opens or closes the passage or feed-opening.

From this opening the grain falls upon the first screen, D, which has meshes about one-fourth of an inch in diameter.

The wheat for seeding-purposes should be the largest and finest, and should be as free as possible from oats, barley, mustard, and other small seeds, and it is for the purpose of making such a separation that the screens are used.

The screen D is placed so as to slope forward at a sufficient angle to discharge all the chaff, broken or crushed wheat, and some of the oats and barley, which pass from its surface into the trough E.

Below the screen D, and inclined in the same direction, are zinc screens, F, of which two or three may be used.

These screens catch all the remaining barley and oats, and discharge them into the trough E, which declines, each side, from the centre, and thus carries off the refuse.

Below the screens F, is a screen, G, having its meshes small enough to catch the large wheat, which is carried forward and discharged into the mixing-cylinder H.

The small wheat, which will be fit for market, although not for seed, passes through the screen G, and is caught by a still finer screen, I, which declines toward the back of the machine, and discharges into a trough, J, from which the wheat may be saved.

The mustard and small seeds will pass through this last screen, and fall upon the ground.

All these screens are placed in an oscillating frame, K, and by its motion the grain is separated.

The screens are movable, and may be changed at pleasure, and other sizes substituted for beans, or any other grain to be cleaned.

The frame K is supported and swings on the rods L, and receives its motion, by the pitman M, from the cranks at N N′, on each side of the machine.

The feed-roller C is driven by a belt from the pulley O.

The mixing-cylinder H contains the stirrer P, constructed in any suitable form, and which is rotated by the crank Q.

Above the cylinder is a tank, R, which contains the solution of sulphate of copper.

A sliding gate, S, controls the discharge from the tank to the cylinder, and is moved up or down by the screws T.

After the wheat is thoroughly mixed with the solution, it passes out through an opening at V, and over a screen, W, from which it may be again sacked, and is then ready to be sown.

To facilitate the movement of the wheat over the screen W, a cam, Y, is mounted on the shaft $g$, and as it revolves, raises the screen-frame, giving it a shaking motion, which also assists in freeing the wheat from surplus moisture.

Whatever part of the solution escapes from the mixing-cylinder, passes into a trough, $h$, at the bottom of the machine, from which it may be drawn off by a cock, $m$, and returned to the tank R.

A belt, $n$, from the pulley $r$, drives the pulley O', and through it the shaking-frame K.

The shaft $g$ and cam Y are driven by another belt, $t$, from the pulley $r$.

By this machine, I am enabled to cleanse the wheat from all its impurities, and select only such as will prove the best for seed.

I am also enabled to thoroughly mix and saturate it with the solution for preventing smut, and the depredations of birds and animals, the whole operation taking much less time and being more satisfactory than when done in the old way, by hand.

Having thus described my invention,

What I claim as new, and desire to secure by Letters Patent, is—

1. The device for regulating the feed, consisting of the hinged bottom $a$, the lug $b$, and plate $c$, operated by the screw $d$, substantially as herein described.

2. The oscillating frame K, with the screens D, F, G, and I, and the discharge-trough E and J, for separating and conveying the different classes, substantially as herein described.

3. The mixing-cylinder H, with its stirrer P, and the overflow-trough $h$, substantially as and for the purpose described.

4. In combination with the mixing-cylinder, the tank R, with its adjustable gate S, for supplying the solution, substantially as described.

5. The vertically-shaking screen W, with its operating-cam Y, for partially drying the grain and discharging it, substantially as herein described.

In witness whereof, I have hereunto set my hand and seal.

JAMES J. CROWLEY. [L. S.]

Witnesses:
WILLIAM STANIFORTH.
JOHN L. BOONE.